United States Patent
Al-Saud et al.

(10) Patent No.: US 9,752,556 B1
(45) Date of Patent: Sep. 5, 2017

(54) MULTI-ROTOR VERTICAL AXIS WIND TURBINE

(71) Applicant: KING SAUD UNIVERSITY, Riyadh (SA)

(72) Inventors: Mamdooh Saud Thinyyan Al-Saud, Riyadh (SA); Ali Mohamed Ahmed Eltamaly, Riyadh (SA); A. M. A. Al-Ahmari, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/345,423

(22) Filed: Nov. 7, 2016

(51) Int. Cl.
| | | |
|---|---|---|
| *F03D 3/02* | (2006.01) | |
| *F03D 3/00* | (2006.01) | |
| *F03D 9/25* | (2016.01) | |
| *F03D 80/70* | (2016.01) | |
| *H02K 7/18* | (2006.01) | |
| *F03D 9/00* | (2016.01) | |

(52) U.S. Cl.
CPC .............. *F03D 3/02* (2013.01); *F03D 3/005* (2013.01); *F03D 9/003* (2013.01); *F03D 9/25* (2016.05); *F03D 80/70* (2016.05); *H02K 7/183* (2013.01); *F05B 2220/706* (2013.01); *F05B 2240/211* (2013.01); *F05B 2240/50* (2013.01); *F05B 2250/131* (2013.01)

(58) Field of Classification Search
CPC ........ Y02E 10/725; Y02E 10/72; Y02E 10/74
USPC ..................................................... 290/55, 44
See application file for complete search history.

(56) References Cited

U.S. PATENT DOCUMENTS

| | | | |
|---|---|---|---|
| 6,674,181 B2 | 1/2004 | Harbison | |
| 7,364,406 B2* | 4/2008 | Kinkaid | F03D 3/005 416/132 B |
| 8,154,145 B2* | 4/2012 | Krauss | F03D 3/0409 290/44 |
| 8,464,990 B2* | 6/2013 | Flores | F03D 9/00 248/178.1 |
| 2009/0015017 A1* | 1/2009 | Rashidi | F03D 3/002 290/55 |
| 2009/0066088 A1* | 3/2009 | Liang | F03D 3/067 290/55 |

(Continued)

FOREIGN PATENT DOCUMENTS

WO    WO 2012/082953 A2    6/2012

OTHER PUBLICATIONS

"Vertical-axis small wind turbine/helical Savonius rotor," http://www.archiexpo.com/prod/windside/product-88530-959470.html. (Accessed on Jun. 15, 2016) 5pgs.

*Primary Examiner* — Tulsidas C Patel
*Assistant Examiner* — Charles Reid, Jr.
(74) *Attorney, Agent, or Firm* — Richard C. Litman

(57) ABSTRACT

The multi-rotor vertical axis wind turbine includes a plurality of vertical wind rotors rotatably mounted on support arms extending from the vertices of upper and lower polygonal frame members. The upper end of each rotor is journaled into a plain bearing, and a lower portion is journaled into a freewheeling clutch bearing. A pulley wheel is mounted on the lower end of each rotor. A generator is centrally located beneath the lower frame member and has a rotatable armature shaft extending vertically upward. The pulley wheel of each vertical rotor is connected to the armature shaft by its own separate endless belt.

2 Claims, 1 Drawing Sheet

(56) References Cited

U.S. PATENT DOCUMENTS

| | | | |
|---|---|---|---|
| 2009/0096213 A1* | 4/2009 | Berglund | F03D 3/061 |
| | | | 290/44 |
| 2009/0224552 A1 | 9/2009 | Sulentic | |
| 2011/0101694 A1* | 5/2011 | Cowap | F03D 3/062 |
| | | | 290/52 |
| 2012/0161448 A1 | 6/2012 | Khedekar et al. | |
| 2013/0051975 A1* | 2/2013 | Makulec | F01D 25/18 |
| | | | 415/1 |
| 2013/0094967 A1* | 4/2013 | Su | F03D 3/02 |
| | | | 416/202 |
| 2013/0119672 A1* | 5/2013 | Boone | F03D 3/005 |
| | | | 290/55 |
| 2013/0129509 A1* | 5/2013 | Manning | F03D 3/068 |
| | | | 416/17 |
| 2014/0361539 A1* | 12/2014 | Carter | F03D 7/06 |
| | | | 290/44 |
| 2015/0021922 A1 | 1/2015 | Bates et al. | |
| 2015/0369216 A1* | 12/2015 | Kisovec | F03D 3/068 |
| | | | 290/44 |

* cited by examiner

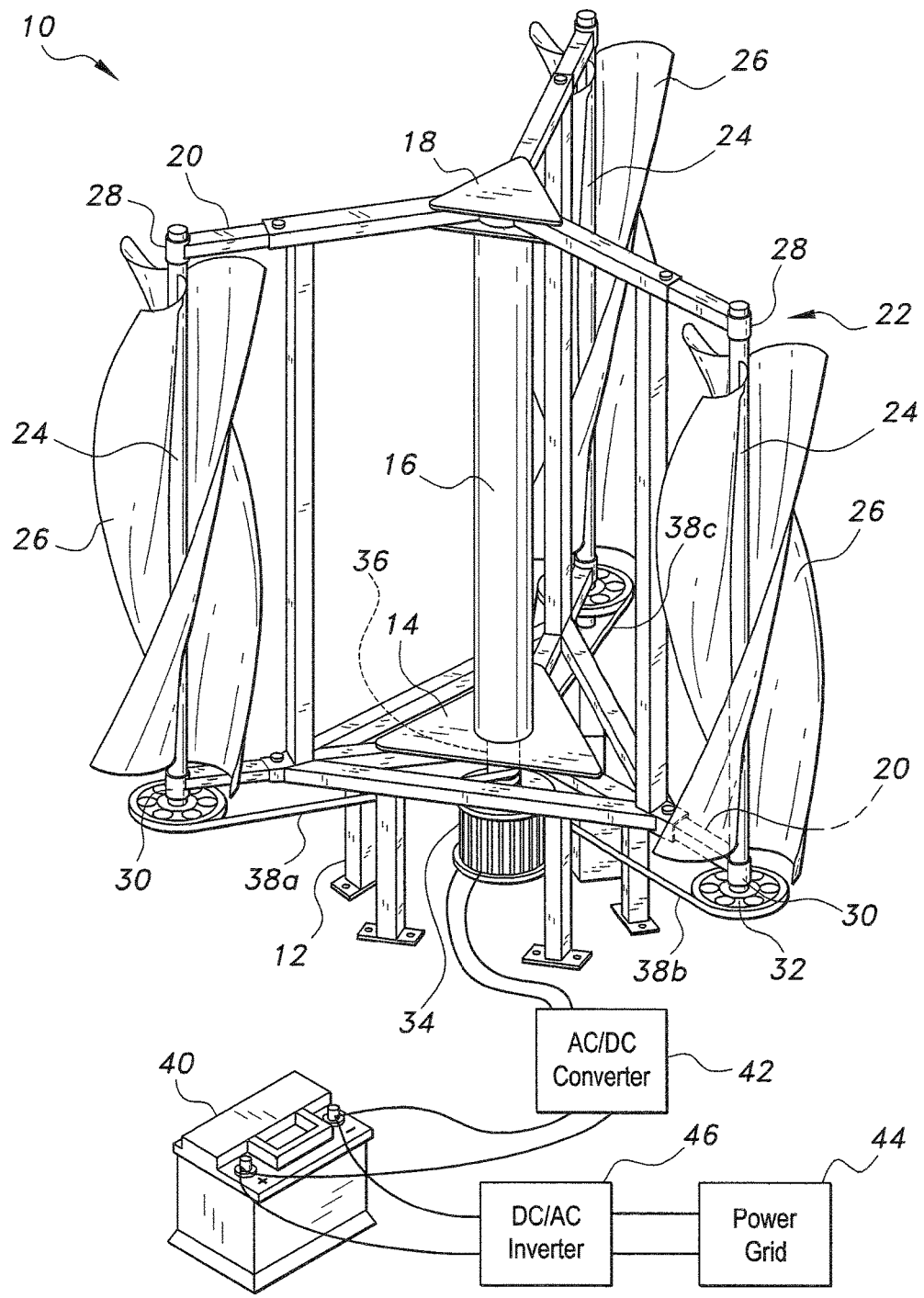

MULTI-ROTOR VERTICAL AXIS WIND TURBINE

BACKGROUND OF THE INVENTION

1. Field of the Invention

The present invention relates to wind turbines, and particularly to a multi-rotor vertical axis wind turbine in which the rotors are mechanically connected to a single generator.

2. Description of the Related Art

There are two main types of wind turbines, namely, horizontal axis wind turbines and vertical axis wind turbines, horizontal axis wind turbines being the more common of the two types of turbines. While there are a variety of different configurations for horizontal axis wind turbines, the most common configuration typically includes two or three blades. While horizontal axis wind turbines include a large amount of output power, horizontal axis wind turbines tend to require constant reorientation, since the wind changes direction. Further, since the generator, gearbox, and control system are all positioned on the top of the horizontal axis wind turbine, maintenance is not only time-consuming, but also very difficult and costly. The horizontal axis wind turbines also have a higher cut-in speed, which is a problem in low wind-speed sites.

Vertical axis wind turbines, on the other hand, have a lower cut-in speed when compared to horizontal axis wind turbines, which is suitable for low wind-speed sites, such as Riyadh, Saudi Arabia, as well as a narrow range of rated output power. There typically is no need to reorient vertical axis wind turbines when the wind direction changes and no associated additional costs. Further, since the gear box, generator, and control system are positioned at ground level, maintenance is much easier, as well as less costly than the maintenance associated with horizontal axis wind turbines. Vertical axis wind turbines are also typically easier to implement, and typically have a significantly lower manufacturing cost than the alternative horizontal axis wind turbines. However, connecting multiple generators having a low rating power output to a corresponding wind turbine not only reduces the overall system efficiency, but also renders maintenance rather costly, as there is more equipment to maintain.

Thus, a multi-rotor vertical axis wind turbine solving the aforementioned problems is desired.

SUMMARY OF THE INVENTION

The multi-rotor vertical axis wind turbine includes a plurality of vertical wind rotors rotatably mounted on support arms extending from the vertices of upper and lower polygonal frame members. The upper end of each rotor is journaled into a plain bearing, and a lower portion is journaled into a freewheeling clutch bearing. A pulley wheel is mounted on the lower end of each rotor. A generator is centrally located beneath the lower frame member and has a rotatable armature shaft extending vertically upward. The pulley wheel of each vertical rotor is connected to the armature shaft by its own separate endless belt. The polygonal disposition of the rotors ensures that no more than two rotors are coplanar at any angle, leaving the other rotors exposed to the wind, while the freewheeling clutch bearings disconnect the rotor (drive shaft) from the armature shaft (driven shaft) when the armature is rotating faster than the rotor so that no rotor is a load on the other rotors.

These and other features of the present invention will become readily apparent upon further review of the following specification and drawings.

BRIEF DESCRIPTION OF THE DRAWINGS

The sole drawing FIGURE is an environmental perspective view of a multi-rotor vertical axis wind turbine according to the present invention.

DETAILED DESCRIPTION OF THE PREFERRED EMBODIMENTS

The multi-rotor vertical axis wind turbine includes a plurality of vertical wind rotors rotatably mounted on support arms extending from the vertices of upper and lower polygonal frame members. The upper end of each rotor is journaled into a plain bearing, and a lower portion is journaled into a freewheeling clutch bearing. A pulley wheel is mounted on the lower end of each rotor. A generator is centrally located beneath the lower frame member and has a rotatable armature shaft extending vertically upward. The pulley wheel of each vertical rotor is connected to the armature shaft by its own separate endless belt. The polygonal disposition of the rotors ensures that no more than two rotors are coplanar at any angle, leaving the other rotors exposed to the wind, while the freewheeling clutch bearings disconnect the rotor (drive shaft) from the armature shaft (driven shaft) when the armature is rotating faster than the rotor so that no rotor is a load on the other rotors.

Referring to the sole drawing FIGURE, the multi-rotor vertical axis wind turbine 10 has an exemplary frame supported on stanchions 12. The frame includes a lower polygonal frame member 14, a central column 16 extending upward from the lower frame 14, and a polygonal upper frame member 18 mounted on the column 16. In the drawing, the upper frame member 18 and the lower frame member 14 are triangular, supporting three rotors. However, it will be understood that the frame may have other polygonal shapes to support more rotors, e.g., a diamond to support four rotors, a pentagon to support five rotors, a hexagon to support six rotors, etc. Support arms 20 extend radially from the vertices of the upper frame member 18 and the lower frame member 14.

A rotor 22 extends vertically between the ends of each upper and lower support arm 20. Each rotor 22 includes an axle or shaft 24 and at least one foil or blade 26 helically wound from the upper end of the rotor shaft 24 to the lower end for catching the wind. The upper end of each rotor shaft 24 is journaled into a plain bearing 28 (e.g., a ball bearing assembly) at the end of the upper support arm 20. The rotor shaft is also journaled into a freewheeling clutch bearing 30 adjacent the lower end of the rotor shaft 24 at the end of the lower support arm 20. A pulley wheel 32 is rigidly mounted on the lower end of the rotor shaft 24 so that the pulley wheel 32 rotates when the wind catches the rotor blade 26 and causes the rotor shaft 24 to rotate.

A generator 34 is positioned centrally beneath the lower frame member 14. The generator has a rotatable armature shaft 36 extending vertically upward substantially coaxial with the frame column 16. Separate and independent endless belts 38a, 38b, and 38c extend around the pulley wheel 32 and the armature shaft 36 to connect each rotor 22 with the generator 34. Alternatively, the generator 34 may be positioned in an offset or eccentric location relative to the central frame axis, provided that each rotor 22 is independently connected to the armature shaft 36 by a separate endless belt 38a, 38b, 38c. The generator 34 may be connected to a storage battery 40 by an AC/DC converter 42 for storing electricity generated by the turbine 10, and subsequently connected to a power grid 44 by a DC/AC converter 46.

In use, when the angle of attack of the wind against the rotor blade(s) 24 is favorable, the rotor 22 will rotate in the bearings 28, 30, thereby rotating the attached pulley wheel 32, which rotates the armature shaft 36 via the endless belt 38a, 38b, or 38c to generate electricity. If the armature shaft 36 is already rotating faster than the rotor 22 due to acceleration by one of the other rotors 22, the freewheeling clutch bearing 30 will disconnect the slower rotor 22 from the armature shaft 36 so that the slower rotor 36 freewheels in order to avoid placing a load on the armature shaft 36. Thus, if the rotor 22 connected to the armature shaft by endless belt 38a is driving the armature shaft 36 faster than the rotors 22 connected by endless belts 38b and 38c are rotating, the corresponding freewheeling clutch bearings 30 will disconnect the rotors 22 connected by endless belts 38b and 38c from the armature shaft 36 so that those rotors 22 do not place a load on the rotor 22 driving the armature shaft 36 through endless belt 38a. Since the rotors 22 are disposed polygonally, rather than collinearly or coplanar, the turbine 10 reduces the wind shadow or wind turbine wake effect and allows the generator 34 to be driven by the rotor 22 most favorably exposed to the wind at any given moment. Connecting all of the rotors 22 to a single generator 34 eliminates the need for separate converters 42 for each rotor 22, reducing equipment cost and increasing the efficiency of the generator 34 and turbine 10.

It is to be understood that the present invention is not limited to the embodiments described above, but encompasses any and all embodiments within the scope of the following claims.

We claim:

1. A multi-rotor vertical axis wind turbine, comprising:
a lower frame and an upper frame, each of frames being polygonal and defining vertices;
a plurality of support arms, each of the support arms having a proximal end and a distal end, wherein the proximal end is nonrotatably attached to and extending from each of the vertices of the upper and lower frames;
a plurality of vertically oriented rotors, each of the vertically oriented rotors being rotatably mounted on the distal end of each of the support arms, the rotors being positioned at the vertices of the frame in order to reduce wind shadow effect, each of the rotors having a rotor shaft and at least one blade attached to the shaft, the at least one blade being configured for catching the wind to rotate the rotor, wherein each one of the at least one blade being helically wound about the rotor shaft from an upper end to a lower end;
a single generator having a rotatable armature shaft extending therefrom, wherein the single generator is centrally positioned so that the armature shaft defines a central axis extending through the upper and lower frames; and
a plurality of endless belts, each of the endless belts connecting a corresponding rotor to the armature shaft, so that the rotors independently drive the armature shaft to rotate in order to generate electricity.

2. The multi-rotor vertical axis wind turbine according to claim 1, further comprising a plurality of freewheeling clutch bearings, each of said rotors being journaled into a corresponding one of the freewheeling bearings, whereby the freewheeling clutch bearing disconnects the corresponding rotor from said armature shaft when said armature shaft is already being driven by another one of said rotors to rotate faster than the corresponding rotor, leaving the corresponding rotor to rotate freely, thereby reducing load on the rotor driving said armature shaft.

* * * * *